United States Patent
Horovitz et al.

(10) Patent No.: US 9,983,894 B2
(45) Date of Patent: May 29, 2018

(54) METHOD AND SYSTEM FOR PROVIDING SECURE SYSTEM EXECUTION ON HARDWARE SUPPORTING SECURE APPLICATION EXECUTION

(71) Applicant: Facebook, Inc., Menlo Park, CA (US)

(72) Inventors: Oded Horovitz, Palo Alto, CA (US); Stephen A. Weis, San Francisco, CA (US); Sahil Rihan, Menlo Park, CA (US); Carl A. Waldspurger, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 132 days.

(21) Appl. No.: 14/497,111

(22) Filed: Sep. 25, 2014

(65) Prior Publication Data

US 2015/0089502 A1 Mar. 26, 2015

Related U.S. Application Data

(60) Provisional application No. 61/882,008, filed on Sep. 25, 2013.

(51) Int. Cl.
*G06F 9/455* (2018.01)

(52) U.S. Cl.
CPC ...... *G06F 9/45545* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 5,875,472 | A | 2/1999 | Bauman et al. |
| 6,026,475 | A | 2/2000 | Woodman et al. |
| 6,044,478 | A | 3/2000 | Green et al. |
| 6,129,458 | A | 10/2000 | Waters et al. |
| 6,223,256 | B1 | 4/2001 | Gaither et al. |
| 6,389,442 | B1 | 5/2002 | Yin et al. |
| 6,697,927 | B2 | 2/2004 | Bonola et al. |
| 6,957,304 | B2 | 10/2005 | Wilkerson et al. |
| 6,970,960 | B1 | 11/2005 | Sarfati et al. |
| 7,266,661 | B2 | 9/2007 | Walmsley et al. |
| 7,434,000 | B1 | 10/2008 | Barreh et al. |

(Continued)

OTHER PUBLICATIONS

McKeen et al., Innovative Instructions and Software Model for Isolated Execution, Jun. 24, 2013, Workshop on Hardware and Architectual Support for Security and Privacy.*

(Continued)

*Primary Examiner* — Emerson Puente
*Assistant Examiner* — Steven Do
(74) *Attorney, Agent, or Firm* — FisherBroyles, LLP

(57) ABSTRACT

An application such as a virtual machine are executed securely using a software-based, full-system emulator within a hardware-protected enclave, such as an SGX enclave. The emulator may thereby be secure even against a malicious underlying host operating system. In some cases, paging is used to allow even a large application may run within a small enclave using paging. Where the application itself uses enclaves, these guest enclaves may themselves be emulated within an emulator enclave such that the guest enclave(s) are nested as sibling enclaves by the emulator.

16 Claims, 3 Drawing Sheets

(56) References Cited

U.S. PATENT DOCUMENTS

| | | | |
|---|---|---|---|
| 7,577,851 B2 | 8/2009 | Inamura et al. | |
| 7,657,756 B2 | 2/2010 | Hall et al. | |
| 7,671,864 B2 | 3/2010 | Román et al. | |
| 7,774,622 B2 | 8/2010 | Mitra et al. | |
| 8,037,250 B1 | 10/2011 | Barreh et al. | |
| 8,135,962 B2 | 3/2012 | Strongin et al. | |
| 8,266,676 B2 | 9/2012 | Hardjono et al. | |
| 8,352,718 B1 | 1/2013 | Rao et al. | |
| 8,549,288 B2 | 10/2013 | Bade et al. | |
| 8,615,665 B2 | 12/2013 | Fitton et al. | |
| 8,726,364 B2 | 5/2014 | Smith et al. | |
| 8,738,932 B2 | 5/2014 | Lee et al. | |
| 8,782,433 B2 | 7/2014 | Kaabouch et al. | |
| 8,812,796 B2 | 8/2014 | Gray et al. | |
| 8,886,959 B2 | 11/2014 | Tamiya et al. | |
| 8,904,477 B2 | 12/2014 | Walker et al. | |
| 8,924,743 B2 | 12/2014 | Wolfe et al. | |
| 8,949,797 B2 | 2/2015 | Christodorescu et al. | |
| 8,990,582 B2 | 3/2015 | McGrew et al. | |
| 9,164,924 B2 | 10/2015 | Horowitz et al. | |
| 9,361,449 B2 | 6/2016 | Sugano | |
| 9,477,603 B2 | 10/2016 | Waldspurger et al. | |
| 9,639,482 B2 | 5/2017 | Weis et al. | |
| 9,734,092 B2 | 8/2017 | Weis et al. | |
| 9,747,450 B2 | 8/2017 | Horovitz et al. | |
| 2002/0004860 A1 | 1/2002 | Roman et al. | |
| 2002/0116584 A1 | 8/2002 | Wilkerson et al. | |
| 2002/0116595 A1 | 8/2002 | Morton et al. | |
| 2002/0138700 A1 | 9/2002 | Holmberg et al. | |
| 2003/0033480 A1 | 2/2003 | Jeremiassen et al. | |
| 2003/0065892 A1 | 4/2003 | Bonola et al. | |
| 2003/0188178 A1 | 10/2003 | Strongin et al. | |
| 2003/0236947 A1 | 12/2003 | Yamazaki et al. | |
| 2004/0111639 A1† | 6/2004 | Schwartz | |
| 2006/0015748 A1 | 1/2006 | Goto et al. | |
| 2006/0020941 A1 | 1/2006 | Inamura et al. | |
| 2006/0080553 A1 | 4/2006 | Hall et al. | |
| 2006/0179228 A1 | 8/2006 | Thompson et al. | |
| 2007/0239938 A1 | 10/2007 | Pong et al. | |
| 2007/0288228 A1* | 12/2007 | Taillefer | G06F 9/45537 703/28 |
| 2008/0010413 A1 | 1/2008 | Kailas et al. | |
| 2008/0022160 A1 | 1/2008 | Chakraborty et al. | |
| 2008/0109660 A1 | 5/2008 | Mitra et al. | |
| 2008/0229118 A1 | 9/2008 | Kasako et al. | |
| 2008/0235804 A1 | 9/2008 | Bade et al. | |
| 2009/0094601 A1 | 4/2009 | Vstovskiy | |
| 2009/0254895 A1 | 10/2009 | Chen et al. | |
| 2009/0328195 A1 | 12/2009 | Smith et al. | |
| 2010/0005300 A1 | 1/2010 | Klotsche et al. | |
| 2010/0062844 A1 | 3/2010 | Crowder, Jr. et al. | |
| 2010/0064144 A1 | 3/2010 | Kaabouch et al. | |
| 2010/0115620 A1 | 5/2010 | Alme et al. | |
| 2010/0268692 A1 | 10/2010 | Resch et al. | |
| 2010/0281223 A1 | 11/2010 | Wolfe et al. | |
| 2010/0281273 A1 | 11/2010 | Lee et al. | |
| 2010/0287385 A1 | 11/2010 | Conte et al. | |
| 2011/0022818 A1 | 1/2011 | Kegel et al. | |
| 2011/0040940 A1 | 2/2011 | Wells et al. | |
| 2011/0047362 A1 | 2/2011 | Eichenberger et al. | |
| 2011/0113260 A1 | 5/2011 | Ma et al. | |
| 2011/0167278 A1 | 7/2011 | Goto et al. | |
| 2011/0258610 A1 | 10/2011 | Aaraj et al. | |
| 2011/0314468 A1† | 12/2011 | Zhou | |
| 2012/0124296 A1 | 5/2012 | Bryant et al. | |
| 2012/0317569 A1* | 12/2012 | Payne, Jr. | G06F 21/53 718/1 |
| 2013/0067245 A1 | 3/2013 | Horovitz et al. | |
| 2013/0090091 A1 | 4/2013 | Weng et al. | |
| 2013/0125244 A1 | 5/2013 | Sugano et al. | |
| 2013/0159726 A1* | 6/2013 | McKeen | G06F 21/53 713/189 |
| 2013/0191651 A1 | 7/2013 | Muff et al. | |
| 2013/0254494 A1 | 9/2013 | Oxford et al. | |
| 2013/0263121 A1 | 10/2013 | Franke et al. | |
| 2014/0007087 A1* | 1/2014 | Scott-Nash | G06F 21/53 718/1 |
| 2014/0108649 A1† | 4/2014 | Barton | |
| 2014/0173275 A1 | 6/2014 | Johnson et al. | |
| 2014/0201452 A1 | 7/2014 | Meredith et al. | |
| 2015/0067265 A1 | 3/2015 | Weis et al. | |
| 2015/0089152 A1 | 3/2015 | Busaba | |
| 2015/0089153 A1 | 3/2015 | Busaba | |
| 2015/0089154 A1 | 3/2015 | Busaba | |
| 2015/0089155 A1 | 3/2015 | Busaba | |
| 2015/0089159 A1 | 3/2015 | Busaba | |
| 2015/0134932 A1 | 5/2015 | Mcnairy | |
| 2015/0149732 A1 | 5/2015 | Kiperberg et al. | |
| 2015/0186295 A1 | 7/2015 | Long et al. | |
| 2015/0227744 A1 | 8/2015 | Horowitz et al. | |
| 2015/0269091 A1 | 9/2015 | Horowitz et al. | |
| 2015/0378731 A1 | 12/2015 | Lai | |
| 2016/0224475 A1 | 8/2016 | Horovitz et al. | |
| 2017/0206167 A1 | 7/2017 | Waldspurger et al. | |

OTHER PUBLICATIONS

"Intel 64 and IA-32 Architectures Software Developer's Manual, vol. 3 (3A, 3B & 3C): System Programming Guide," Intel Corporation, Dec. 2015, pp. 1-1698. [Part 1].

"Intel 64 and IA-32 Architectures Software Developer's Manual, vol. 3 (3A, 3B & 3C): System Programming Guide," Intel Corporation, Dec. 2015, pp. 1-1698. [Part 2].

"Intel 64 and IA-32 Architectures Software Developer's Manual, vol. 3 (3A, 3B & 3C): System Programming Guide," Intel Corporation, Dec. 2015, pp. 1-1698. [Part 3].

"Intel 64 and IA-32 Architectures Software Developer's Manual, vol. 3 (3A, 3B & 3C): System Programming Guide," Intel Corporation, Dec. 2015, pp. 1-1698. [Part 4].

"Intel 64 and IA-32 Architectures Software Developer's Manual, vol. 3 (3A, 3B & 3C): System Programming Guide," Intel Corporation, Dec. 2015, pp. 1-1698. [Part 5].

"Intel 64 and IA-32 Architectures Software Developer's Manual, vol. 3 (3A, 3B & 3C): System Programming Guide," Intel Corporation, Dec. 2015, pp. 1-1698. [Part 6].

"Intel 64 and IA-32 Architectures Software Developer's Manual, vol. 3 (3A, 3B & 3C): System Programming Guide," Intel Corporation, Dec. 2015, pp. 1-1698. [Part 7].

Trusted Computing Group, [retrieved on Nov. 12, 2015], Retrieved from the internet: <http://www.trustedcomputinggroup.org>, 2015, 1 page.

Cache management via page coloring, Wikipedia, [retrieved on Nov. 12, 2015], Retrieved from the Internet: <http://en.Wikipedia.org/wiki/cache_coloring>, Nov. 6, 2015, 2 pages.

Hardware security module, Wikipedia, [retrieved on Nov. 12, 2015], Retrieved from the Internet: <http://en.wikipedia.org/wiki/hardware_security_module>, Oct. 21, 2015, 5 pages.

Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.

Anati Ittai, et al., "Innovative Technology for CPU Based Attestation and Sealing", Proceedings of the Second International Workshop on Hardware and Architectural Support for Security and Privacy (HASP '13), Jun. 2013, pp. 1-7.

Baumann, A., et al., "Shielding Applications from an Untrusted Cloud wth Haven," Proceedings of the 11th USENIX Symposium on Operating Systems Design and Implementation, Oct. 6-8, 2014, pp. 267-283.

Bellard, F., "QEMU, a fast and portable dynamic translator", Proceedings of the USE NIX 2005 Annual Technical Conference, FREEN/X Track, Apr. 2005, pp. 41-46.

Bochs, "The Cross-Platform IA-32 Emulator" [retrieved on Aug. 26, 2015] Retrieved from the Internet: <http://bochs.sourceforge.net/>, May 3, 2015, 2 pages.

Bugnion, E. et al., "Compiler-directed page coloring for multiprocessors", Proceedings of the Seventh International Conference on

(56) References Cited

OTHER PUBLICATIONS

Architectural Support for Programming Languages and Operating Systems (ASPLOS VII), ACM, Oct. 1996, 12 pages.
Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.
Chen, X., et al., "Operating System Controlled Processor-Memory Bus Encryption", in Proceedings of Design, Automation and Test in Europe, 2008, (DATE'08), IEEE, pp. 1154-1159.
Iyer, Ravi, "CQoS: A Framework for Enabling QoS in Shared Caches of CMP Platforms," In Proceedings of the 18th Annual International Conference on Supercomputing (ICS '04), ACM, Jun. 26-Jul. 1, 2004, pp. 257-266.
McKeen, F., et al., "Innovative Instructions and Software Model for Isolated Execution", Proceedings of the Second International Workshop on Hardware and Architectural Support for Security and Privacy (HASP '13), ACM, Jun. 2013, pp. 1-8.
Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.
Peterson, Peter A.H., "Cryptkeeper: Improving Security with Encrypted RAM", in IEEE International Conference on Technologies for Homeland Security (HST 2010), Nov. 2010, pp. 1-7.
Ports, Dan R.K. et al., "Towards application security on untrusted operating systems", Proceedings of the Third Conference on Hot Topics in Security (HOTSEC '08), Jul. 2008, 7 pages.
Rosenblum, M., et al., "Using the SimOS machine simulator to study complex computer systems", ACM Transactions on Modeling and Computer Simulation, vol. 7, Issue 1, Jan. 1997, pp. 78-103.
Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.
Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102.
Advisory Action dated Aug. 19, 2014, for U.S. Appl. No. 13/614,935 of Horovitz, O. et al., filed Sep. 13, 2015.
Extended European Search Report dated Aug. 5, 2015, for European Patent Application No. 12831564.5, 7 pages.
Final Office Action dated Jun. 5, 2014, for U.S. Appl. No. 13/614,935 of Horovitz, O., filed Sep. 13, 2012.
International Search Report and Written Opinion of International Application No. PCT/US12/55210, dated Jan. 25, 2013, 11 pages.
Non-Final Office Action dated Feb. 19, 2015, for U.S. Appl. No. 13/614,935 of Horovitz, O., filed Sep. 13, 2012.
Non-Final Office Action dated Nov. 18, 2013, for U.S. Appl. No. 13/614,935 of Horovitz, O., filed Sep. 13, 2012.
Notice of Allowance dated Jul. 15, 2015, for U.S. Appl. No. 13/614,935 of Horovitz, O., filed Sep. 13, 2012.
Restriction Requirement dated Aug. 27, 2013, for U.S. Appl. No. 13/614,935 of Horovitz, O. et al., filed Sep. 13, 2015.
U.S. Appl. No. 13/614,935, of Horovitz, O., et al. filed Sep. 13, 2012.
U.S. Appl. No. 14/479,239 of Horovitz, O. et al., filed Aug. 5, 2014.
U.S. Appl. No. 14/504,203 of Horovitz, O. et al., filed Oct. 1, 2014.
U.S. Appl. No. 14/618,099 of Horovitz, O. et al., filed Feb. 10, 2015.
U.S. Appl. No. 14/663,217 of Horovitz, O. et al., filed Mar. 19, 2015.
U.S. Appl. No. 14/820,428 of Horovitz, O. et al., filed Aug. 6, 2015.
Non-Final Office Action dated Nov. 15, 2016, for U.S. Appl. No. 14/618,099 of Horovitz, O. et al., filed Feb. 10, 2015.
Non-Final Office Action dated Oct. 6, 2016, U.S. Appl. No. 14/820,428 of Horovitz, O. filed Aug. 6, 2015.
U.S. Appl. No. 15/274,981 of Waldspurger, C., et al., filed Sep. 23, 2016.
Non-Final Office Action dated Nov. 30, 2016, for U.S. Appl. No. 14/504,203 of Horovitz, O. et al., filed Oct. 1, 2014.
Notice of Allowance dated Jun. 27, 2016, for U.S. Appl. No. 14/479,239 of Waldspurger, C. et al., filed Sep. 5, 2014.
Non-Final Office Action dated Jul. 27, 2016, for U.S. Appl. No. 14/663,217 of Horovitz, O. et al., filed Mar. 19, 2015.
First Office Action dated Aug. 2, 2016, for Japanese Patent Application No. 2014-530797, 7 pages.
Deayton, Peter et al., "Set Utilization Based Dynamic Shared Cache Partitioning", Parallel and Distributed Systems (ICPADS), 2011 IEEE 17th International Conference, Dec. 7-9, 2011, pp. 284-291.
Li, Zhiyuan , "Reducing Cache Conflicts by Partitioning and Privatizing Shared Arrays", Parallel Architectures and Compilation Techniques Proceedings, International Conference on 1999, 1999, pp. 183-190.
Rajimwale, Abhishek et al., "Coerced Cache Eviction and Discreet Mode Journaling: Dealing with Misbehaving Disks", IEEE/IFIP 41st International Conference on Dependable Systems & Networks (DSN), Jun. 27-30, 2011, pp. 518-529.
Notice of Allowance dated Jan. 25, 2017 for U.S. Appl. No. 14/820,428 of Horovitz, O. et al., filed Aug. 6, 2015.
Final Office Action dated Jan. 13, 2017, for U.S. Appl. No. 14/663,217 of Horovitz, O. et al., filed Mar. 19, 2015.
Second Office Action dated Dec. 6, 2016 for Japanese Patent Application No. 2014-530797, 4 pages.
Final Office Action dated May 18, 2017 for U.S. Appl. No. 14/504,203 of Horovitz, O. et al., filed Oct. 1, 2014.
Notice of Allowance dated May 4, 2017, for U.S. Appl. No. 14/618,099 of Horovitz, O. et al., filed Feb. 10, 2015.
Advisory Action dated Aug. 8, 2017 for U.S. Appl. No. 14/504,203 by Horovitz, O. et al., filed Oct. 1, 2014.
Non-Final Office Action dated Sep. 11, 2017 for U.S. Appl. No. 14/504,203 by Horovitz, O. et al., filed Oct. 1, 2014.
Notice of Allowance dated Jun. 15, 2017 of U.S. Appl. No. 14/663,217 by Horovitz, O., et al., filed Mar. 19, 2015.

* cited by examiner
† cited by third party

METHOD AND SYSTEM FOR PROVIDING SECURE SYSTEM EXECUTION ON HARDWARE SUPPORTING SECURE APPLICATION EXECUTION

CROSS-REFERENCE TO RELATED APPLICATIONS

This application claims priority of U.S. Provisional Patent Application No. 61/882,008, filed 25 Sep. 2013.

FIELD OF THE INVENTION

This invention relates to a method and related system implementation for enabling secure execution of a process such as a virtual machine in hardware architectures that support secure application execution.

BACKGROUND

Recent extensions to computer processors, such as the Intel Software Guard Extensions (SGX) for the x86 processor architecture, provide hardware support for secure application execution. Such extensions allow a user-mode application to create a protected region, known as an "enclave", within the application's address space. The hardware provides confidentiality and integrity for an enclave, even from privileged malware and physical attacks on memory, through cryptography and hardware isolation of memory. In other words, SGX comprises a set of instructions and memory access changes to the Intel architecture that allow a process to create a protected region of its address space, known as an "enclave", which provides hardware-enforced confidentiality and integrity protection for data and code against potentially-malicious privileged code or hardware attacks such as memory probes.

Unfortunately, in some implementations, this hardware protection does not extend to the secure execution of system software. For example, the stated intent of Intel SGX is to isolate trusted application components, completely removing privileged software, such as an OS or hypervisor, from the trusted computing base. See, for example, Frank Mckeen, et al., "Innovative Instructions and Software Model for Isolated Execution", *Proceedings of the Second International Workshop on Hardware and Architectural Support for Security and Privacy* (*HASP* '13), Tel-Aviv, Israel, June 2013 ("McKeen").

The first-generation version of Intel SGX is expected to support only the execution of unprivileged, user-mode instructions within an enclave. Moreover, as currently architected, an enclave must reside entirely within a single virtual address space, and protected memory cannot be shared across enclaves. As a result, these hardware extensions are not able to protect the code and data of system-level software that manages multiple address spaces, or executes privileged, kernel-mode instructions directly, including commodity operating systems (OSes) such as Linux and Microsoft Windows.

Nevertheless, most applications depend on a properly-functioning OS for various system services, including access to hardware I/O devices through abstractions such as files, sockets, and processes. Unfortunately, a compromised OS may attempt to undermine application security through malicious manipulation of the system call interface. This threat is described, for example, in Xiaoxin Chen, et al., "Overshadow: A Virtualization-Based Approach to Retrofitting Protection in Commodity Operating Systems", *Proceedings of the Thirteenth International Conference on Architectural Support for Programming Languages and Operating Systems* (ASPLOS '08), Seattle, Wash., March 2008 ("Chen"); and Dan R. K. Ports and Tal Garfinkel, "Towards application security on untrusted operating systems", *Proceedings of the Third Conference on Hot Topics in Security* (HOTSEC '08), San Jose, Calif., July 2008. As a result, secure applications must be designed explicitly to avoid leaking data to a potentially-hostile OS, which imposes a significant burden on application developers. Clearly, it would be desirable to help protect an OS from becoming compromised in the first place, such as by providing the same hardware-enforced confidentiality and integrity safeguards offered to applications.

Moreover, public cloud computing platforms, such as Amazon EC2 and Microsoft Windows Azure, typically execute customer computations as virtual machines (VMs). As is well known, A VM encapsulates both user-mode applications and kernel-mode OS system software within a single container. In virtualized environments, the term "guest" is commonly used to distinguish the layer of software running within a VM; a "guest OS" thereby manages applications and virtual hardware. The term "host" is commonly used to refer to the layer of software—often referred to as a "hypervisor" and/or virtual machine monitor (VMM), depending on the configuration—that manages VMs and physical hardware.

In public cloud environments, customers do not have physical control over the hardware on which their VMs are executing, making them vulnerable to both physical and software-based attacks by a malicious or compromised cloud service provider. As a result, there is a need to protect the integrity and confidentiality of entire virtual machines, containing both user-mode applications and kernel-mode system software.

DETAILED DESCRIPTION

Broadly, different embodiments of this invention provide a software-based method to secure the execution of a virtual machine, leveraging processor features that offer strong hardware guarantees regarding memory integrity and confidentiality. In an embodiment, this method additionally allows applications within a VM to utilize the same processor features to create protected regions isolated from the guest OS; providing such a capability preserves the isolation of secure applications from all privileged software, consistent with the original motivation for Intel SGX.

Ideally, it would be advantageous in many situations to be able to nest secure execution regions flexibly at multiple levels. Enabling such secure, nested execution regions would then be able to support a strategy of "defense in depth", considered a best practice for security as explained in "Defense in Depth: A practical strategy for achieving Information Assurance in Today's highly networked environments" by the National Security Agency. Multiple protective layers of security may thereby be employed, at different levels of the system, making penetration more difficult for an attacker. In one useful two-level embodiment, an "outer enclave" protects an entire VM (including its guest OS) from the virtualization layer and physical attacks, while an "inner enclave" protects trusted application components from more privileged software (including the guest OS) and physical attacks. Many other configurations are possible, as explained below.

Figure 1:
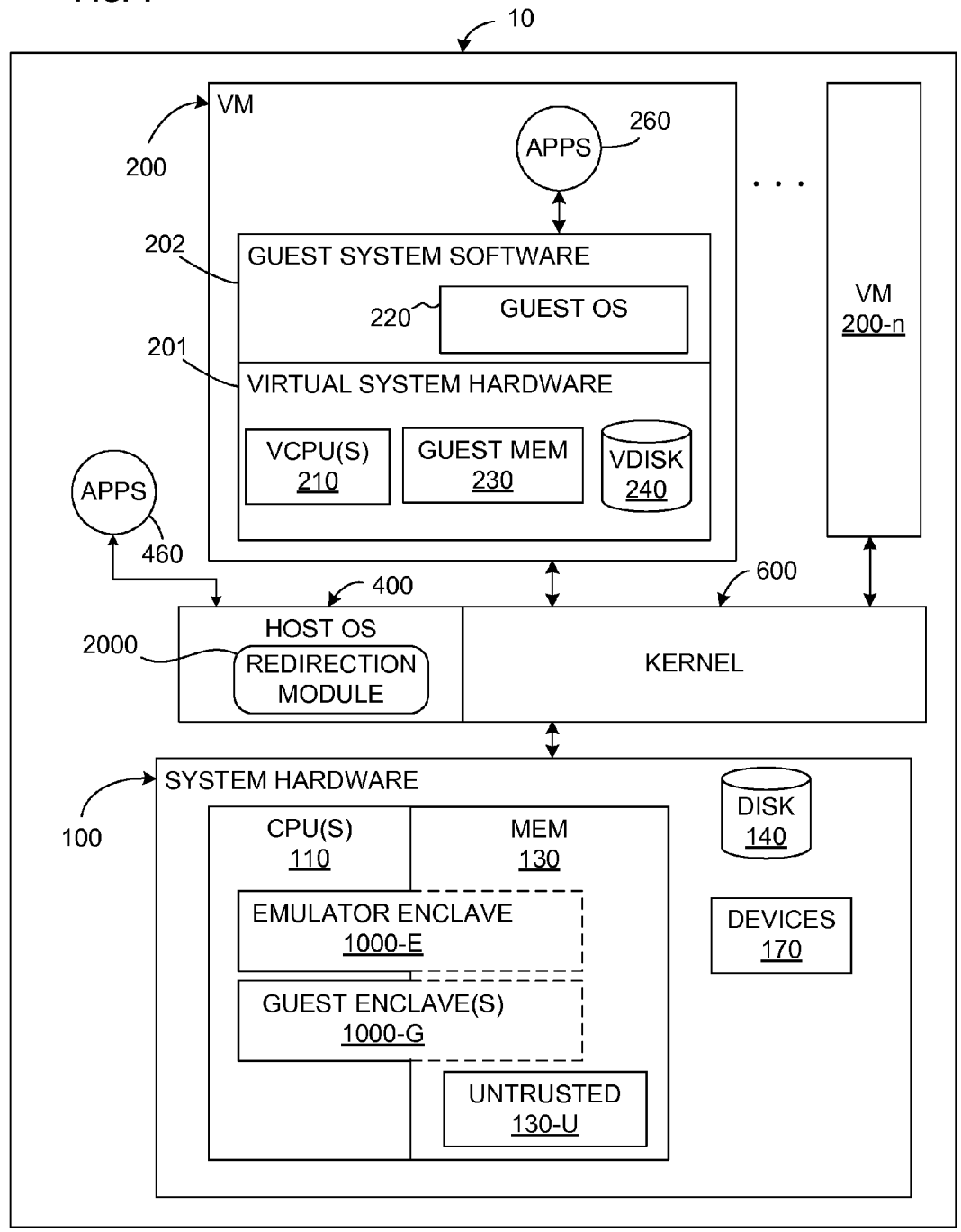
FIG. 1 shows the main hardware and software components of a computer system in which virtual machines (VMs) are running, in which the system is configured with enclaves and includes a novel emulation system.

Although the general structure of a computer system 10 that includes virtualization is well known, FIG. 1 illustrates some of the main components so as to later be able to show the relationship between such components and novel emulation components. As is well known in the field of computer science, a virtual machine (VM) is a software abstraction—a "virtualization"—of an actual physical computer system. Each of any number of VMs 200, . . . , 200-*n*, is installed as a "guest" on a "host platform," or simply "host". User level applications 260 may also run on the VM 200.

The host will generally include system hardware 100, that is, a hardware platform, and one or more layers or co-resident components comprising system-level software, such as an operating system (OS) 400 or similar software layer responsible for coordinating and mediating access to hardware resources. As in almost all computers, this hardware will include one or more CPUs or CPU cores 110, some form of memory 130 (volatile or non-volatile), and one or more storage devices such as disks 140.

Each VM 200 will typically mimic the general structure of a physical computer and as such will usually have both virtualized, guest system hardware 201 and guest system software 202. The virtual system hardware typically includes one or more virtual CPUs 210, virtual memory 230, and at least one virtual disk 240 or similar virtualized mass storage device. The guest system software includes a guest operating system (OS) 220 which performs the functions of most other OSes and in many cases may (but need not) in fact be simply instances of commodity operating systems.

Some interface is generally required between the guest software within a VM and the various hardware components and devices in the underlying hardware platform. This interface—which may be referred to generally as "virtualization software" or "virtualization layer"—may include one or more software components and/or layers, possibly including one or more of the software components known in the field of virtual machine technology as "virtual machine monitors" (VMMs), "hypervisors," or virtualization "kernels." These terms do not always provide clear distinctions between the software layers and components to which they refer, however, and in many modern systems the concepts they represent and functions they perform are merged. For example, "hypervisor" is often used to describe both a VMM and a kernel together. FIG. 1 shows a kernel 600 to represent all such alternative configurations.

FIG. 1 also shows, simply by way of illustrating one possibility, that the kernel 600 and the host OS 400 can be considered and may in fact be implemented as a single component; indeed, in some cases, the kernel 600 is part of the host operating system 400 itself. This invention does not depend on any particular arrangement of the system software that handles VM system calls and the system software, such as OS 400, that supports other user-level processes such as applications 460.

One point to keep in mind is that data "stored" in the guest memory 230—which is a software abstraction—must actually be stored in some physical device, usually the system memory 130. One or more of the guest OS 220, the kernel 600 or host OS 400, possibly other components, as well as the system hardware (in the form of a memory management unit MMU) therefore maintain various address translation maps that allow for one or more levels of address redirection, such as a mapping of virtual addresses to physical addresses, often with one or more additional intermediate mappings. For example, a virtual address submitted to the guest OS 220 in the VM 200 may first be mapped to a "guest-physical address" used to address the guest memory 230 or virtual disk 240—both virtualized versions of hardware structures—which is then mapped again to the actual physical address used to access the hardware memory 130 or disk 140. One consequence of this is that, even though the guest memory 230 is shown as being located within the VM 200, this is mostly conceptual, since the data "stored" in the guest memory will actually be stored in the hardware memory 130. In other words, the guest memory 230 is merely an abstraction of a portion (not necessarily contiguous) of the physical address space.

FIG. 1 also shows three features used by embodiments of this invention: an emulator enclave 1000-E and one or more guest enclaves 1000-G within the hardware memory 130, and a redirection module 2000 within the host OS 400. These are discussed below. In systems configured using an Intel architecture, the enclaves may be Intel SGX enclaves; embodiments of the invention may be configured for other architectures and enclave-like structures the same as or functionally equivalent to SGX as they may later be developed and become available. As FIG. 1 also shows, non-secured portions of the memory's 130 address space are untrusted, labeled 130-U.

As FIG. 1 illustrates, the concept of an "enclave" involves both the memory and the hardware processor itself. In practice, to implement one or more enclaves, the CPU 110 is configured by the manufacturer to enable selection of one or more portions of memory and to transparently encrypt and verify its/their contents as it/they get/s pulled into the CPU cache for execution and access. Thus, the active component of an enclave will reside within the CPU, although its contents may, when not active, reside within the selected portion of memory. Reference here to an enclave being in any given memory is therefore merely for the sake of simplicity and this operation of an enclave is to be assumed.

Different embodiments of the invention provide secure VM execution through software-based, full-system emulation of the VM within a hardware-protected enclave 1000-E. A user-space emulator 3000 thus runs as an application within an enclave on the host, protecting the entire guest VM that it is emulating from more privileged host software and physical attacks. The emulator is hardened to operate under a potentially compromised or hostile host OS. Known techniques and software routines may be employed to emulate any given VM.

In some implementations, the emulator also manages some resources explicitly, to avoid placing undesirable constraints on VM configurations due to any resource limitations associated with enclaves. For example, the emulator may need to execute a VM that is too large to remain fully resident within a maximum-size enclave. In such cases, the emulator can employ known software-based techniques, such as encrypted paging, to ensure the confidentiality and integrity of guest memory, without relying on special hardware support.

The emulator may be further extended to support enclaves within a VM. For example, the emulator 3000, itself running within its own enclave 1000-E, may emulate the execution of Intel SGX instructions that create or manipulate guest enclaves within the VM. Such nested guest enclaves may be realized by creating corresponding enclaves within the host, as siblings of the emulator enclave.

Figure 2:
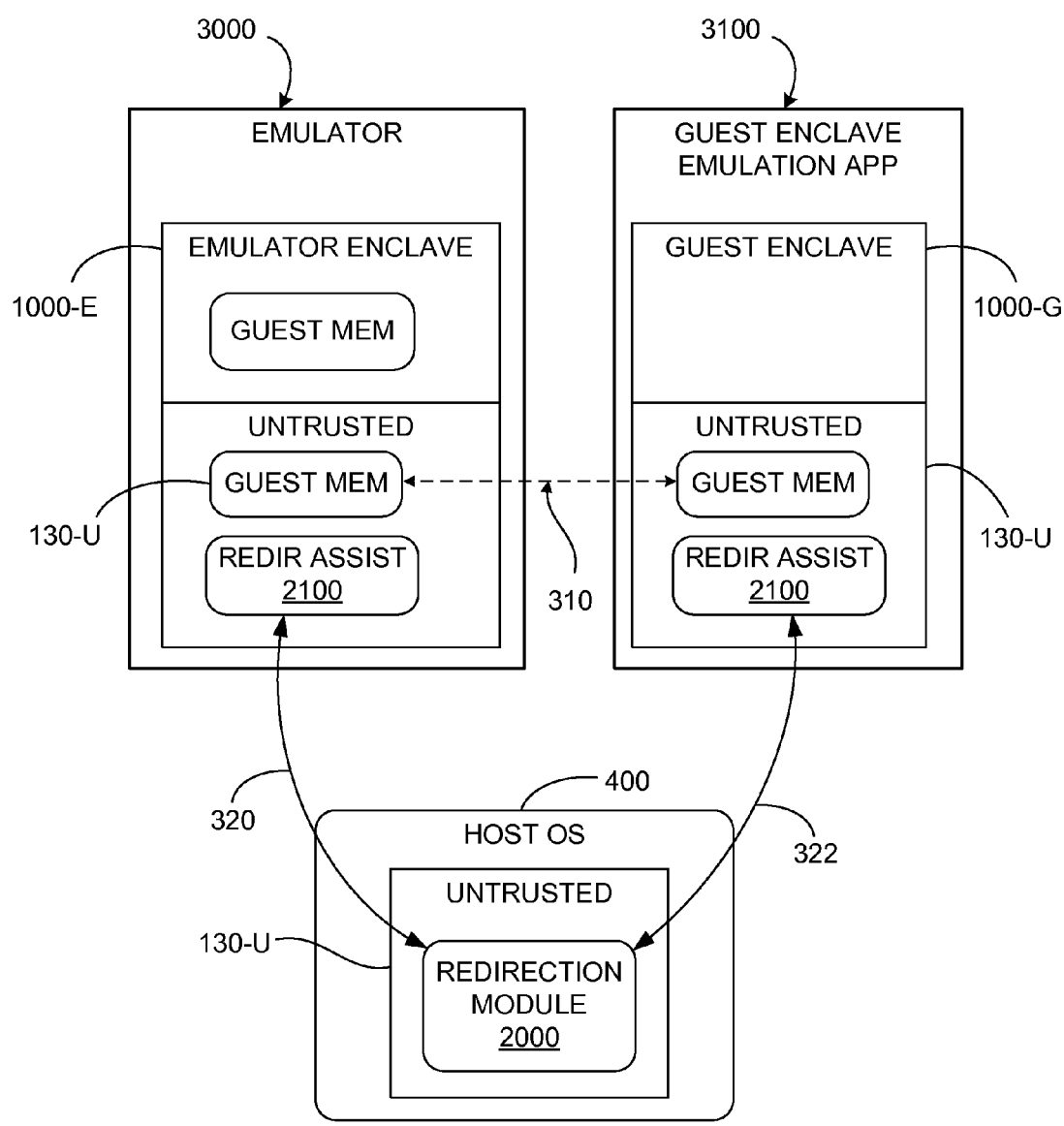
FIG. 2 illustrates an emulator that emulates a VM containing a guest enclave.

FIG. 2 illustrates how secure VM execution is provided through software-based emulation, running completely within an enclave: An emulator application 3000 emulates a VM containing a guest enclave 1000-G. Non-enclave guest code, however, executes within the emulator enclave 1000-E. The VM itself executes within a separate guest-enclave emulation application 3100, in a distinct host-virtual address space. The redirection module 2000 in the host OS 400 redirects enclave exits between the guest enclave 1000-G and the emulator enclave 1000-E, leveraging code, via system interface calls (indicated by arrows 320, 322), embodied in a redirection-assist module 2100 loaded into the untrusted portions of each application. Most guest memory will typically reside in the emulator enclave. Any untrusted guest memory accessed by the trusted guest enclave resides in non-enclave, unprotected memory that is mapped into both the main emulator and guest-enclave-emulation applications, as indicated by the dashed arrow 310.

The emulator 3000 itself may execute unprivileged user-mode code to perform its simulation of a full computer system, that is, of a VM. By running an emulator entirely within an enclave 1000-E, however, the complete emulated system—including both user-mode applications and kernel-mode OS system software within the VM—is protected by the hardware mechanisms that safeguard the confidentiality and integrity of the enclave.

Previous full-system emulators capable of executing a VM in user-mode include QEMU (see Fabrice Bellard, "QEMU, a fast and portable dynamic translator", *Proceedings of the USENIX 2005 Annual Technical Conference, FREENIX Track*, April 2005), SimOS (see Mendel Rosenblum, et al., "Using the SimOS machine simulator to study complex computer systems", *ACM Transactions on Modeling and Computer Simulation*, volume 7, issue 1, January 1997), and Bochs ("The Cross-Platform IA-32 Emulator"). Emulators commonly employ a variety of techniques and optimizations to simulate instruction execution, including instruction interpretation and dynamic binary translation. An emulator may be limited to running a VM compatible with the instruction set architecture (ISA) of the physical host, or it may be designed to support cross-ISA emulation, for example, running a virtual ARM-based guest on a physical x86-based host.

Like any application, an emulator still depends on a host OS for various services. Prior emulators were not designed to execute securely on a system where the host OS may be compromised and potentially hostile. In contrast, the enclave-resident emulator 3000 defends itself from the host OS, carefully avoiding any leaks of sensitive information via the system call interface, including networking and storage I/O operations. Following a defense-in-depth strategy, the security of the host system may be improved further by additionally leveraging trusted boot and execution technologies, such as Intel TXT.

Practical hardware implementations of processor support for secure application execution may limit the maximum size of a single enclave, and/or limit the total amount of protected physical memory aggregated across all enclaves. To execute VMs configured with larger amounts of guest-physical memory, enclave memory must be securely swapped to untrusted storage such as RAM, flash, or disk.

In some implementations, the emulator may depend on an untrusted host OS to manage and demand-page enclave memory securely, for example, using the Intel SGX EWB and ELD extensions to the x86 instruction set (see McKeen). In other implementations or system configurations, the emulator application 3000 itself may implement secure paging of guest-physical memory. For example, the emulator can demand-page guest memory to untrusted memory, employing cryptographic techniques such as encryption and message authentication codes to ensure confidentiality and integrity. Such secure memory management can be performed entirely in software, using secure paging techniques similar to those employed in the vCage hypervisor provided by PrivateCore, Inc., which includes a software-based cryptoprocessor system, disclosed in U.S. Published Patent Application 2013/0067245 A1, published 14 Mar. 2013.

One embodiment extends the emulator to support Intel SGX instructions within the VM. This may be desired to allow applications running within the VM to create secure enclaves, protected from the guest OS within the VM. Well-known techniques such as interpretation or dynamic binary translation may be used to enable the emulator to recognize and decode Intel SGX instructions. However, secure emulation of application enclaves is challenging, since these nested enclaves must be isolated from the emulator itself.

Figure 3:
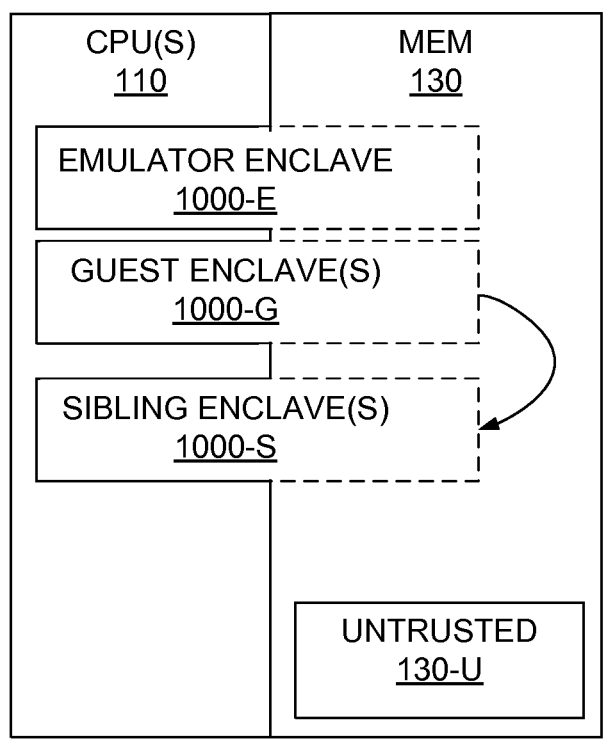
FIG. 3 illustrates sibling enclaves.

An embodiment of the invention, illustrated in FIG. 3, is therefore provided to emulate nested enclaves by creating sibling enclaves 1000-S that execute natively on the host, alongside the emulator's enclave 1000-E. A separate sibling enclave 1000-S is thus created for each emulated guest enclave. Note that enclave creation is already designed to be secure, despite the presence of potentially compromised or malicious system software.

The emulator system may employ various approaches for associating enclaves with virtual address spaces. For example, each emulated guest enclave may be run in a distinct host OS process, with its own private host-virtual address space. For emulated guest enclaves associated with the same guest-virtual address space, it may be advantageous to share the same host-virtual address space, since this facilitates the emulation of implicit sharing of untrusted, non-enclave memory. While it is possible to place multiple unrelated enclaves into a single virtual address space, this may be difficult due to potential virtual address conflicts, and may be undesirable due to the inherently weaker isolation of a shared address space.

The emulator system may also load user-mode code into the same virtual address space as the emulated guest enclave, in order to assist with enclave emulation. For example, the emulator-provided user-mode code could serve as "wrapper" or "trampoline" code to facilitate the redirection of control flow on enclave exit events, between emulated enclaves and the emulator enclave, as described below.

The same approach can be applied to provide arbitrary levels of nesting, with each guest enclave implemented as an enclave running directly on the host, regardless of the emulated nesting level. Because each emulated guest enclave actually runs natively on the processor, it may participate in attestation protocols and secure inter-enclave communications (see Ittai Anati, et al., "Innovative Technology for CPU Based Attestation and Sealing", *Proceedings of the Second International Workshop on Hardware and Architectural Support for Security and Privacy (HASP '13)*, Tel-Aviv, Israel, June 2013), and it remains isolated from all other software in the system.

Since each emulated enclave executes directly on the physical processor, the emulation system must handle events that cause the processor to transition execution into or out of the enclave. For example, an interrupt causes an asynchronous exit from an enclave, referred to as an AEX in Intel SGX terminology. Some asynchronous exits from an emulated enclave, such as those due to interrupts, can be processed by the host OS. The host OS later resumes enclave execution, for example, using the Intel SGX ERESUME instruction. However, some asynchronous enclave exits, such as various exceptions and faults, must be redirected to the emulator, in order to process the event within the context of the appropriate level of emulation.

In order to redirect execution between an emulated guest enclave and its associated emulator enclave appropriately, the emulation system includes a privileged software component that executes within the host, shown here as the redirection module 2000. This software component is designed to cooperate with the emulator 3000, and may be implemented as a loadable kernel module within the host OS. Note that this privileged host module is not trusted by the software running within any enclaves, including the emulator enclave and its emulated guest enclaves. Although a compromised or malicious module could cause denial of service by preventing an enclave from executing, it cannot access or tamper with any code or data within the enclaves. This is consistent with the typical guarantees provided by secure execution systems, such as Intel SGX, which ensure confidentiality and integrity, but not availability.

When an exit from a guest enclave needs to be processed by the emulator, the redirection module 2000 transfers control to the emulator 3000 by re-entering the emulator enclave 1000-E. Redirection may also leverage user-mode code, loaded into the host-virtual address space of the enclaves managed by the emulation system. Such code may facilitate control flow transfers by serving as a "trampoline" that signals or coordinates with the redirection module.

In some cases, the redirection module will communicate data to the emulator, such as information associated with the reason for the guest enclave exit. Various methods can be employed for such communication, including the use of shared regions of untrusted memory accessible to both the emulator enclave and the redirection module. For example, the physical memory pages associated with the communication region can be mapped into both address spaces, using conventional read/write permissions to control the desired sharing or copying of data.

A secure application may also perform synchronous enclave exits explicitly, for example, using the Intel SGX EEXIT instruction. Such explicit exits may be used to switch from the protected portion of an application (within an enclave) to an unprotected portion of the application (outside the enclave). For example, an enclave may exit to interact with the OS through a system call interface. In one implementation, the protected portion of an application writes system call parameters into an untrusted region of memory shared with the unprotected portion of the application, which then invokes a system call that traps into the OS kernel.

When the system call completes, the kernel transitions back to the unprotected user-mode application. The unprotected application code writes the system call result into the untrusted memory region shared with the enclave. The application can then re-enter its protected portion explicitly via the Intel SGX EENTER instruction. In some implementations, generic library code may be provided to act as a "shim" that conveniently wraps system calls, performing argument marshalling and return value unmarshalling transparently for applications. For example, a similar shim-based approach was used in the hypervisor-based Overshadow system (see Chen).

This description of how enclaves may interact with a host OS to perform system calls applies to both native and emulated enclaves. For an emulated guest enclave, the shared memory region used to communicate system-call parameters and results may be shared between the host-virtual address space containing the emulated guest enclave, and the host-virtual address space containing the emulator enclave. In other words, an untrusted portion of the guest application address space is mapped into both the process containing the emulator application and the process containing the guest enclave, as illustrated in FIG. 2.

Unprotected physical memory can be accessed from multiple enclaves, by mapping it into each of their individual virtual address spaces. However, in some implementations of hardware security extensions, such as Intel SGX, protected physical memory is private to a single enclave, and cannot be shared across enclaves. In such systems, any untrusted portion of the virtual address space accessed by the emulated guest enclave cannot reside in protected memory within the emulator enclave. Such guest memory must instead reside in the unprotected portion of the emulator application's host-virtual address space, so that it can be mapped into the host-virtual address space accessible to the emulated guest enclave. As a result, unlike most guest memory (including the guest OS and ordinary guest applications), such guest-enclave-accessed non-enclave guest memory is not protected from the host OS and physical attack. However, despite this limitation, the emulation still preserves the same security model under which the secure application was developed, which assumes explicitly that non-enclave memory cannot be trusted. If necessary, trusted code running within an enclave may encrypt and authenticate data written to and from untrusted non-enclave guest memory.

After handling an exit appropriately, the emulator may itself cause an explicit exit from its own enclave, possibly via user-space trampoline code, to request that the redirection module in the host OS resume execution of the guest enclave that caused the original exit. Note that after initially establishing the shared memory mappings the enable communication between the protected and unprotected portions of the guest application, the redirection module need not be involved in manipulating guest memory contents. However, the redirection module is still needed to coordinate the transfer of execution between the emulator enclave and a guest enclave.

The emulator can employ various approaches for controlling the execution of the protected and unprotected portions of a guest application. In one implementation, two contexts (for example, threads or processes) are associated with each emulated vCPU 210 (FIG. 1), but only one of these contexts is allowed to be actively executing at any point in time. The first "untrusted" context, representing the unprotected portion of the application, resides within the emulator. The second "trusted" context, representing the protected portion of the application, resides within an enclave running within the host OS, alongside the emulator enclave. While the trusted context is executing, the untrusted context remains blocked, waiting for a redirected enclave exit from the trusted context. When the untrusted context is executing, the trusted context has exited its enclave, and will be resumed only after a redirected enclave exit from the untrusted context.

The techniques described in this disclosure are not limited to the secure execution of a single VM by a single full-system emulator. For example, several independent emulators may execute one VM each, in separate, isolated enclaves. Such a configuration may effectively provide a hard partitioning of memory across VMs, with hardware-level protections ensuring that one VM cannot access the memory of other VMs. Alternatively, a single emulator application could be configured to execute several different VMs concurrently within a single enclave. In yet another implementation, a single emulator could execute hypervisor software, such that the emulated hypervisor itself can execute one or more nested virtual machines.

Similarly, emulation is not limited to using a single physical core (or software thread) to emulate each virtual CPU (vCPU) associated with a VM. For example, an emulator may time-multiplex multiple vCPUs onto a single physical core (or software thread), interleaving their emulated executions. Alternatively, an emulator may employ more than one physical core to emulate a single vCPU, in order to improve performance by exploiting available hardware parallelism.

Different embodiments of the invention are described above in the context of providing secure execution of a virtual machine, in particular, by emulating it using code within the secure emulator enclave, or of execution of an application running on a VM. Although "emulation" typically refers to a process of duplication of the functions of one computer system (such as a VM) by another computer system, it would be possible to use the same techniques to secure the execution of other forms of processes/applications as well. For example, it might be beneficial to emulate some hardware devices with code running inside the emulator enclave so as to reduce the risk of a malicious attack on its drivers or operating code.

As with other software, the emulator comprises a body of processor-executable code that will normally be embodied in a non-volatile, non-transitory storage medium before being loaded into memory for execution to perform the various functions described. Any of the steps, operations, or processes described herein may be performed or implemented with one or more hardware or software modules, alone or in combination with other devices. In the various embodiments, the emulator 3000 is a software module implemented with a computer program product comprising a computer-readable medium containing computer program code, which can be executed by the CPU(s) 110 for performing any or all of the steps, operations, or processes described. The code comprising the emulator, including the redirection components 2000, 2100, may be stored in a tangible computer-readable storage medium or any type of media suitable for storing electronic instructions, and coupled to a computer system bus.

At this point, several of the advantages of the various embodiments of the invention should be clear. These include the ability to: 1) run an emulator in SGX and therefore allow full system execution within an SGX enclave; 2) allow a large application (such as a VM) to run within a small SGX enclave using paging; 3) nest SGX enclaves; and 4) secure the emulator even against a malicious underlying host OS.

We claim:

1. A system for providing secure execution of an application comprising:
at least one processor and a memory; and
the memory storing computer code that, when executed:
creates by a host operating system ("OS") an emulator enclave for emulation of a virtual machine ("VM"), wherein the emulator enclave provides a hardware-enforced protected region of an address space of the memory, wherein the emulator enclave is protected from the host OS, and wherein the VM includes quest memory with the emulator enclave being further provided for securely paging the guest memory to an untrusted region of the memory;
under control of the emulator enclave,
emulates execution of instructions of a guest OS of the VM; and
emulates execution of instructions of a guest application for creating a guest enclave for execution of protected code of the guest application wherein the protected code executing in the secure enclave is protected from the guest OS.

2. The system of claim 1, further including a redirection module comprising code executable on the processor for redirecting execution between each guest enclave and the emulator enclave.

3. The system of claim 2, in which the redirection module is loaded in an unsecured portion of memory under the control of the host OS.

4. The system of claim 1, in which the processor has an x86 processor architecture and is configured with Software Guard Extensions (SGX).

5. A method for providing secure execution of an application comprising:
creating by a host operating system ("OS"), an emulator enclave for emulation of a virtual machine ("VM"), wherein the emulator enclave provides a hardware-enforced protected region of an address space of a memory, wherein the emulator enclave is protected from the host OS, and wherein the VM includes guest memory with the emulator enclave being further provided for securely paging the guest memory to an untrusted region of the memory; and
under control of the emulator enclave,
emulating execution of instructions of a guest OS of the VM; and
emulating execution of instructions of a guest application for creating a guest enclave for execution of protected code of the guest application wherein the protected code executing in the secure enclave is protected from the guest OS.

6. The method of claim 5, further comprising emulating instructions creating and managing said guest enclave, such that the guest enclave is nested as a sibling enclave by the emulator enclave.

7. The method of claim 6, further including redirecting execution between each guest enclave and the emulator enclave.

8. The method of claim 7, in which the step of redirecting execution is directed from within an unsecured portion of memory under the control of the host OS.

9. The method of claim 5, in which the processor has an x86 processor architecture and is configured with Software Guard Extensions (SGX).

10. A non-transitory computer-readable storage medium storing instructions, the instructions, when executed by a processor, causing the processor to:
create by a host operating system ("OS") an emulator enclave for emulation of a virtual machine ("VM"), wherein the emulator enclave provides a hardware-enforced protected region of an address space of a memory, wherein the emulator enclave is protected from the host OS, and wherein the VM includes quest memory with the emulator enclave being further provided for securely paging the guest memory to an untrusted region of the memory; and under control of the emulator enclave,
  emulate execution of instructions of a guest OS of the VM; and
  emulate execution of instructions of a guest application for creating a guest enclave for execution of protected code of the guest application wherein the protected code executing in the secure enclave is protected from the guest OS.

11. The medium of claim 10, in which the emulator enclave runs on a host platform, which includes the processor and memory.

12. The medium of claim 11, further storing instructions, upon execution by the processor, causing the processor to redirect execution using code stored unsecured portion of memory under the control of the host OS.

13. The medium of claim 10, in which the processor has an x86 processor architecture and is configured with Software Guard Extensions (SGX).

14. The method of claim 5 wherein the emulator enclave is a full-system emulator.

15. The method of claim 14 wherein the host OS creates multiple emulator enclaves, each emulator enclave for an independent emulator, each independent emulator for executing a VM.

16. The method of claim 5 wherein the emulator enclave emulates a central processing unit.

\* \* \* \* \*